United States Patent
Kizaki et al.

(10) Patent No.: US 8,409,468 B2
(45) Date of Patent: Apr. 2, 2013

(54) LIQUID CRYSTAL COMPOSITION, LIQUID CRYSTAL PANEL USING THE SAME, AND LIQUID CRYSTAL SHUTTER GLASSES

(75) Inventors: Yukio Kizaki, Kanagawa-ken (JP); Hajime Yamaguchi, Kanagawa-ken (JP); Yuko Kizu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/069,918

(22) Filed: Mar. 23, 2011

(65) Prior Publication Data
US 2012/0057086 A1    Mar. 8, 2012

(30) Foreign Application Priority Data
Sep. 2, 2010   (JP) .................. 2010-196983

(51) Int. Cl.
- C09K 19/38  (2006.01)
- C09K 19/52  (2006.01)
- C09K 19/54  (2006.01)
- G02F 1/1333 (2006.01)

(52) U.S. Cl. .................. 252/299.01; 252/299.5; 349/13; 349/183

(58) Field of Classification Search ............. 252/299.01, 252/299.5; 349/13, 183
See application file for complete search history.

(56) References Cited

FOREIGN PATENT DOCUMENTS

| | | |
|---|---|---|
| JP | 2003-327966 | 11/2003 |
| JP | 2010-224406 | 10/2010 |
| JP | 2012052050 A * | 3/2012 |

OTHER PUBLICATIONS

U.S. Appl. No. 13/241,358, filed Sep. 23, 2011, Kizu et al.

* cited by examiner

*Primary Examiner* — Shean C Wu
(74) *Attorney, Agent, or Firm* — Oblon, Spivak, McClelland, Maier & Neustadt, L.L.P.

(57) ABSTRACT

According to one embodiment, a liquid crystal composition includes a liquid crystal material and a polymer. The liquid crystal material exhibits a blue phase. The polymer has a first repeating unit containing a fluorine atom and an acrylic group.

16 Claims, 16 Drawing Sheets

R2; mesogenic unit

R3; (CF$_2$)$_n$CF$_3$
R4; fluoro mesogenic unit

R4; fluoro mesogenic unit

Per fluoro adamantane unit

R2; mesogenic unit

R3; Per fluoro adamantane unit
R4; fluoro mesogenic unit

R4; fluoro mesogenic unit

LIQUID CRYSTAL COMPOSITION, LIQUID CRYSTAL PANEL USING THE SAME, AND LIQUID CRYSTAL SHUTTER GLASSES

CROSS-REFERENCE TO RELATED APPLICATIONS

This application is based upon and claims the benefit of priority from the prior Japanese Patent Application No. 2010-196983, filed on Sep. 2, 2010; the entire contents of which are incorporated herein by reference.

FIELD

Embodiments described herein relate generally to a liquid crystal composition, a liquid crystal panel using the same, and liquid crystal shutter glasses.

BACKGROUND

Embodiments of the invention relate to a liquid crystal composition, a panel using the same, and liquid crystal shutter glasses.

A high response speed can be achieved by using a display mode such as an IPS (in-plane switching) mode, VA (vertically aligned) mode, and OCB (optically compensated bend) mode for a liquid crystal panel. A liquid crystal panel is known using a liquid crystal material exhibiting the Kerr effect as a liquid crystal layer to achieve higher response speed. The Kerr effect is an effect in which the refractive index of a transparent isotropic medium exhibits anisotropy in proportion to the square of the external electric field. In a liquid crystal material exhibiting the Kerr effect, since the correlation length (the influence degree of orientational order) of the liquid crystal molecule is short, the material exhibits a high-speed electric field response of several milliseconds or less and provides a high response speed. Blue phases such as a cholesteric blue phase, smectic blue phase, and quasi-isotropic phase are known as liquid crystal materials exhibiting the Kerr effect.

As a liquid crystal layer using a liquid crystal material of the blue phase, one formed of a liquid crystal material and a polymer network formed by polymerizing an acrylate monomer having an alkyl group chain together with a crosslinker is known. The driving voltage for liquid crystal materials of the blue phase is high.

DETAILED DESCRIPTION

Figure 1:
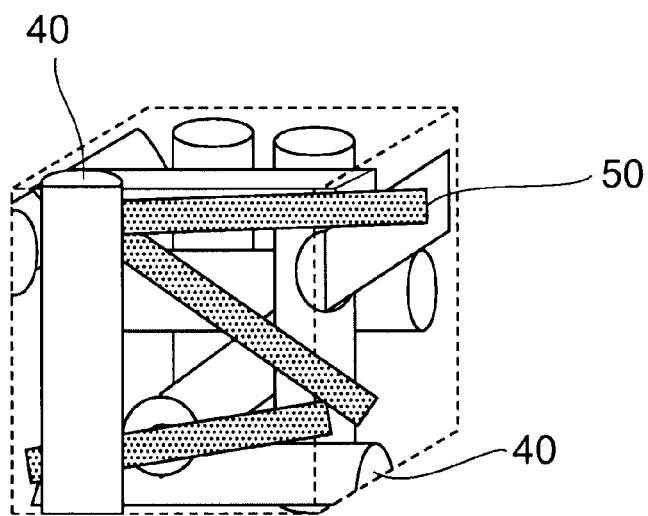
FIG. 1 shows a part of a liquid crystal composition according to a first embodiment.

In general, according to one embodiment, a liquid crystal composition includes a liquid crystal material and a polymer. The liquid crystal material exhibits a blue phase. The polymer has a first repeating unit containing a fluorine atom and an acrylic group.

Various embodiments will be described hereinafter with reference to the drawings. Identical structures are marked with the same reference numerals throughout the drawings and an overlapping description is omitted.

FIG. 1 is a perspective view showing a part of the liquid crystal composition. The liquid crystal composition is formed of a liquid crystal material 40 and a polymer 50.

The liquid crystal material 40 forms a liquid crystal molecule cylinder in which liquid crystal molecules are arranged in a helical form. The arrangement of a plurality of liquid crystal molecule cylinders is in a helical form when macroscopically viewed. The configuration in which liquid crystal molecules are arranged in a helical form to form the liquid crystal molecule cylinder and the liquid crystal molecule cylinders are arranged in a helical form is a feature with which the liquid crystal material exhibits a blue phase. The expression of the blue phase by the liquid crystal material can be confirmed by the fact that, when a voltage is applied to the liquid crystal material, the birefringence or the optical retardation, which is a derivative amount of the birefringence, is in proportion to the square of the applied voltage (the Kerr effect).

The polymer 50 is placed in a space between liquid crystal cylinders formed of the liquid crystal material 40, and holds the location of the liquid crystal cylinders. The polymer 50 contains a fluorine atom and has an acrylic group.

The liquid crystal material 40 is not specifically limited to the extent that it exhibits the blue phase. In addition, two or more liquid crystal materials may be used, and a liquid crystal layer may contain a substance other than the liquid crystal material. As the liquid crystal material, a cholesteric liquid crystal or chiralnematic liquid crystal (hereinafter collectively referred to as a cholesteric liquid crystal), a mixture of a nematic liquid crystal and a cholesteric liquid crystal, a mixture of a nematic liquid crystal and an optically active substance, and the like are given. These liquid crystal materials are used in a temperature range exhibiting a blue phase distinctive of each liquid crystal material.

The polymer 50 has one or more kinds of repeating unit. The number of kinds of repeating unit corresponds to the number of kinds of monomer used for forming the polymer 50. In the case where the number of kinds of repeating unit is one, the repeating unit has an acrylic group and contains a fluorine atom. In the case where the number of kinds of repeating unit is a plural number, at least one kind of the plurality of kinds of repeating unit has an acrylic group and contains a fluorine atom.

Fluorine has a high electronegativity and reduces polarizability, and therefore causes the polymer 50 to have a low dielectric constant. By providing the polymer 50 with a low dielectric constant, the driving voltage of the liquid crystal composition becomes low. Therefore, a liquid crystal panel using a liquid crystal composition like this as the liquid crystal layer reduces the charge amount required for rewriting the display state of the liquid crystal, and can therefore be expected to reduce power consumption. Furthermore, in the case where the polymer is formed using a monomer having fluorine, since chemical properties such as polarity are different between the polymer and impurities, impurities are less easily mixed in and purification is easy. Therefore, a liquid crystal composition with a low level of impurities can be obtained.

Figure 2:
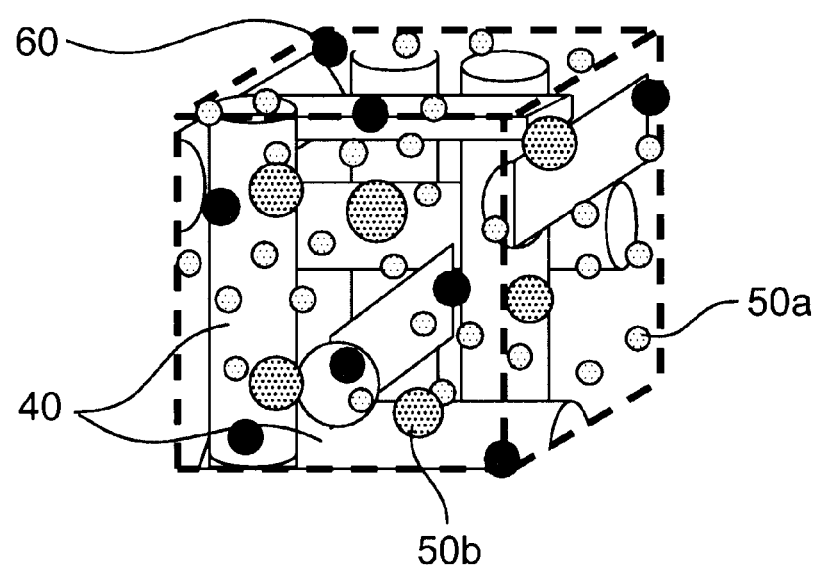
FIG. 2 shows a part of the liquid crystal composition before polymerizing for a polymer according to the first embodiment.

The case where two kinds of monomer are used to form the polymer 50 will now be described with reference to FIG. 2. FIG. 2 is a perspective view showing a part of the liquid crystal composition before polymerizing for the polymer 50. The polymer 50 has a first monomer 50a, a second monomer 50b, and a polymerization initiator 60.

The polymer 50 can be obtained by polymerizing the first monomer 50a and the second monomer 50b by the polymerization initiator 60. The ratio of the polymer 50 contained in the liquid crystal composition is preferably within a range of 5% to 15%. If the ratio of the polymer 50 is less than 5%, it is difficult for the liquid crystal material to maintain the structure and a cholesteric layer may occur partly. If the ratio of the polymer 50 is more than 15%, the transmittance of light at the time of bright display may decrease when the liquid crystal composition is used for a panel. In addition, since the polymer 50 interferes with the movement of liquid crystal molecules, there may be a case where the driving voltage applied to the liquid crystal needs to be raised.

Figure 3:
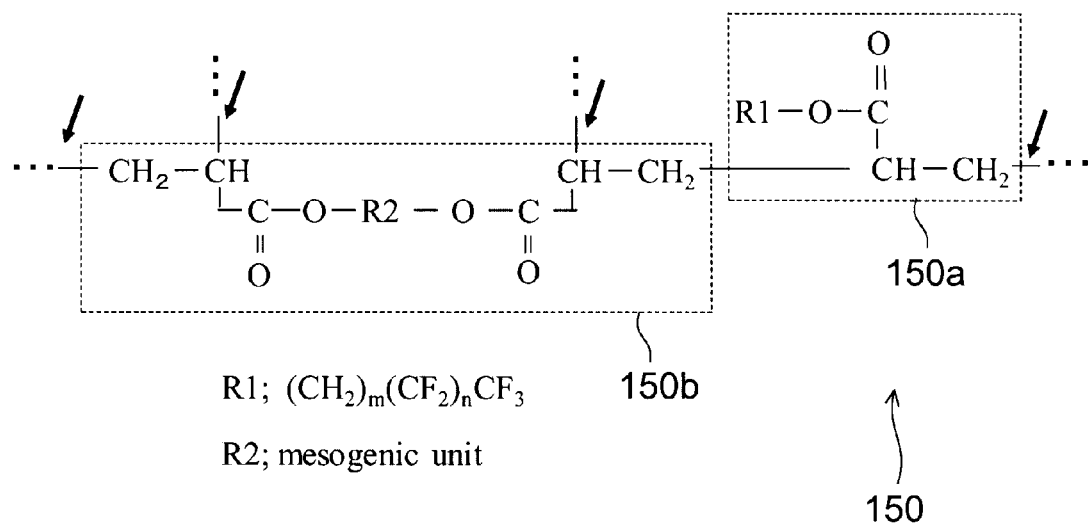
FIG. 3 shows a part of the polymer according to the first embodiment.

FIG. 3 shows, as the polymer 50, the structure of a part of a polymer 150 in which two kinds of monomer having an acrylate unit (—$CH_2$—CH—C=O—O—) are polymerized. The polymer 150 has a first unit 150a and a second unit 150b as repeating units. One polymerization place of the first unit 150a is polymerized with one polymerization place of the second unit 150b. The first unit 150a has an alkyl group R1 substituted with fluorine, and the alkyl group is assumed to be a linear chain in FIG. 3. m and n in the alkyl group R1 are natural numbers. For example, m may be 1 and n may be 6. (n+1) carbon atoms of R1 including the carbon atom at the end farthest from the ether bond have fluorine atoms.

Figure 4:
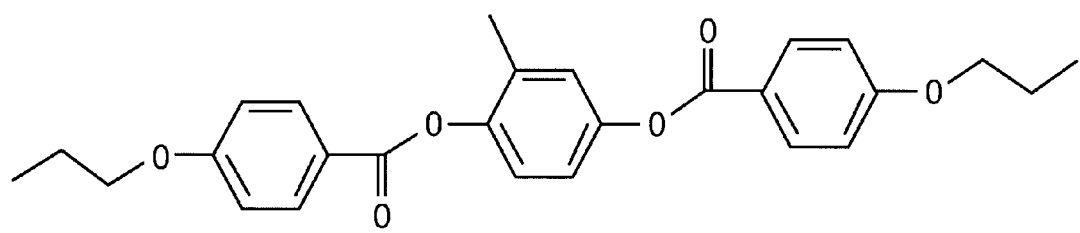
FIG. 4 shows a R2 part of the polymer according to the first embodiment.

R2 of the second unit 150b represents a mesogenic group. For example, a phenyl group, biphenyl group, terphenyl group, phenylcyclohexyl group, biphenylcyclohexyl group, azobenzene group, azoxybenzene group, benzylideneaniline group, stilbene group, and tolan group are given as the mesogenic group. Specifically, the structure of FIG. 4 can be given as R2.

Figure 5A:
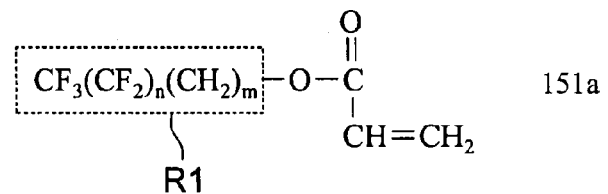
FIGS. 5A and 5B show monomers forming the polymer according to the first embodiment.
Figure 5B:
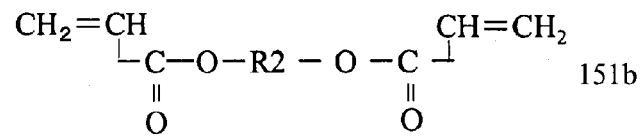

FIG. 5A and FIG. 5B show two kinds of monomer (a first acrylic monomer 151a and a second acrylic monomer 151b) used for forming the polymer 150. The first unit 150a derives from the first acrylic monomer 151a shown in FIG. 5A. The second unit 150b derives from the second acrylic monomer 151b shown in FIG. 5B.

The first unit 150a has two polymerization places (in FIG. 3, the place bonded to the second unit 150b and one place indicated by an arrow), and each polymerization place can thus be polymerized with another first unit 150a or the second unit 150b. The second unit 150b has four polymerization places (in FIG. 3, the place bonded to the first unit 150a and three places indicated by arrows), and each place can thus be polymerized with another first unit 150a or another second unit 150b.

About 2 to 20 first units 150a and about 2 to 20 second units 150b are contained in one polymer. The ratios of the first unit 150a and the second unit 150b are determined by the ratios of the first acrylic monomer 151a and the second acrylic monomer 151b used. For example, the ratio of the first acrylic monomer 151a to the second acrylic monomer 151b is set to one to one.

Figure 6:
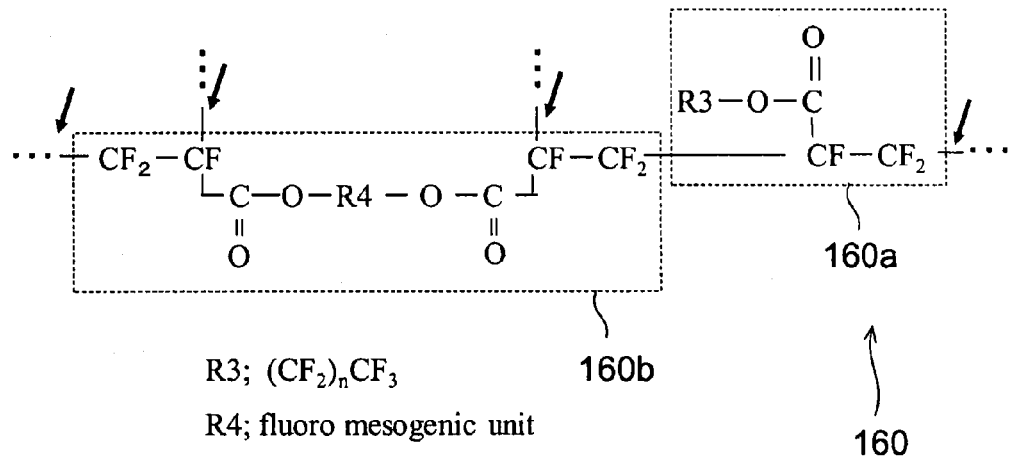
FIG. 6 shows a part of another polymer according to the first embodiment.

FIG. 6 shows a polymer 160 as another example of the polymer. The polymer 160 has a first unit 160a and a second unit 160b. The first unit 160a derives from a first acrylic monomer 161a of FIG. 8A. The second unit 160b derives from a second acrylic monomer 161b of FIG. 8B.

Figure 7:
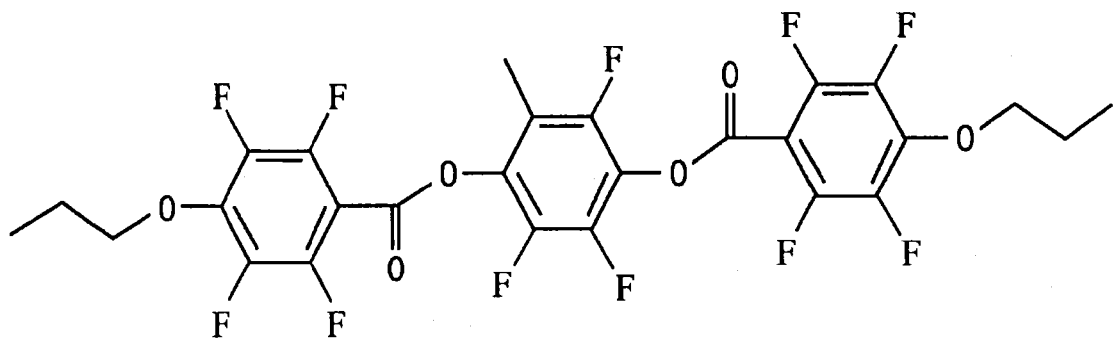
FIG. 7 shows a R4 part of the another polymer according to the first embodiment.

The first unit 160a of the polymer 160 is a structure in which all the hydrogen atoms bonded to carbon atoms are substituted with fluorine atoms in the first unit 150a of the polymer 150 shown in FIG. 3. In other words, in an alkyl group R3 contained in the first unit 160a, a fluorine atom is bonded to all the carbon atoms. The second unit 160b of the polymer 160 is a structure in which the hydrogen atoms of R2 are substituted with fluorine atoms in the second unit of the polymer 150 shown in FIG. 3. In other words, the mesogenic group contained in the second unit 160b of the polymer 160 is R4, a fluoromesogenic group. A structure in which the mesogenic group described above is fluorinated is given as the fluoromesogenic group. Specifically, the structure shown in FIG. 7 is given.

Figure 8A:
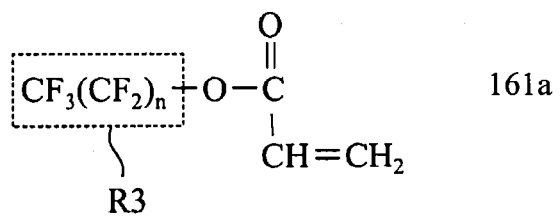
FIGS. 8A and 8B show monomers forming the another polymer according to the first embodiment.
Figure 8B:
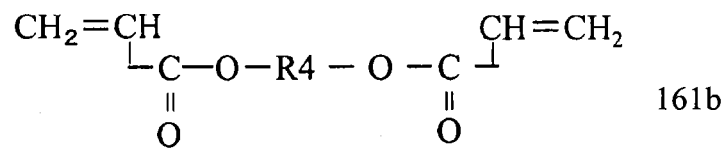

FIG. 8A and FIG. 8B show two kinds of monomer (the first acrylic monomer 161a and the second acrylic monomer 161b) used for forming the polymer 160. The first unit 160a derives from the first acrylic monomer 161a shown in FIG. 8A. The second unit 160b derives from the second acrylic monomer 161b shown in FIG. 8B.

The polymers 150 and 160 described above are only examples, and the embodiment can be carried out by using polymers having other structures.

As the polymerization initiator 60, the following ones, for example, can be given as options, which are easily and commercially available: Darocure™ 1173 (Merck & Co., Inc.), Irgacure™ 651 (Ciba-Geigy Ltd.), Irgacure™ 907 (Ciba-Geigy Ltd.), and the like. The amount of the polymerization initiator added is preferably in a range not more than 5 wt % for one type of monomer from the viewpoint of keeping the liquid crystal material retention rate of the polymer high. The precursor or oligomer may contain a modifier such as a crosslinker, surfactant, polymerization promoter, chain transfer agent, and photosensitizer as necessary.

The liquid crystal composition is formed by a method in which a mixture of a liquid crystal material, monomers, and a polymerization initiator is heated or irradiated with light to change the monomers into a polymer. The polymerization of the monomers is preferably performed by light irradiation in particular. The helical spacing formed by liquid crystal molecule cylinders changes with temperature. As a consequence, a change in the helical spacing results in a change in the wavelength of light reflected by the liquid crystal material. Therefore, in the case where a liquid crystal composition obtained by polymerizing the monomers by heating is used for a liquid crystal panel, the color of the image displayed by the liquid crystal panel may be different from that of design. A liquid crystal composition obtained by polymerization by light irradiation has a limited risk of change in the wavelength of reflected light due to the polymerization.

As described above, the polymer having an acrylic group contains fluorine to reduce the dielectric constant of the polymer, and therefore the driving voltage of the liquid crystal composition can be lowered.

The embodiment is only an example and the scope of the invention is not limited thereto.

Second Embodiment

Figure 9:
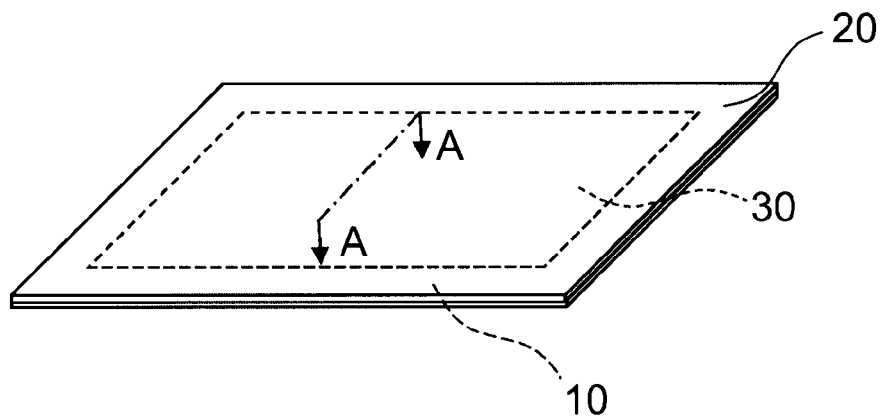
FIG. 9 is a perspective view of a liquid crystal panel according to a second embodiment.

FIG. 9 is a perspective view of a liquid crystal panel that uses the liquid crystal composition of the first embodiment as a liquid crystal layer. A liquid crystal panel 1 includes an array substrate 10 in which a plurality of picture element electrodes arranged in an array configuration and interconnects such as scan lines and signal lines are provided, an opposed substrate 20 opposed to the array substrate 10 at a prescribed spacing, and a liquid crystal layer 30 held between the array substrate 10 and the opposed substrate 20 and formed of the liquid crystal composition described in the first embodiment. The opposed substrate 20 includes an opposed electrode opposed to the plurality of picture element electrodes, for example. Alternatively, the opposed electrode may be provided at the array substrate 10. The liquid crystal panel may further include a voltage application unit (e.g. a driving circuit etc.) that applies a voltage to the liquid crystal layer 30.

The array substrate 10 and the opposed substrate 20 are those having sufficient strength and insulating properties, and transparency. For example, glass, plastics, ceramics, and the like may be used as the substrates 10 and 20.

Figure 10:
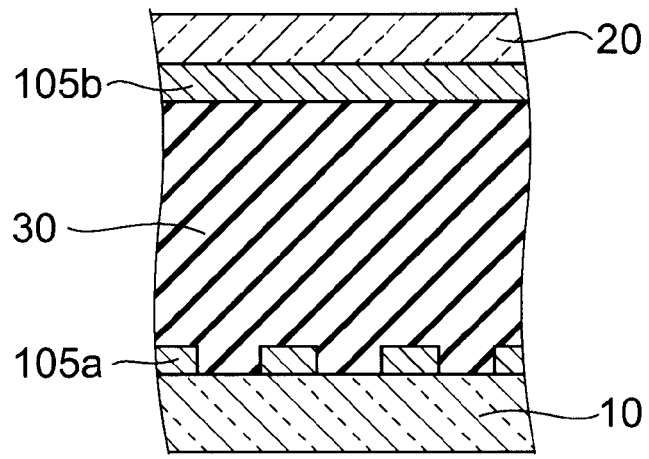
FIG. 10 is a view showing a partial cross section of the liquid crystal panel according to the second embodiment.

FIG. 10 is a view showing a cross section of the liquid crystal panel of FIG. 9 taken along line AA. A plurality of picture element electrodes 105a are arranged on one major surface of the array substrate 10 on the liquid crystal layer 30 side. An opposed electrode 105b is placed on one major surface of the opposed substrate 20 on the liquid crystal layer 30 side as a common electrode.

An insulative thin film (not shown) is formed on the surface of the picture element electrode 105a. A spacer (not shown) is provided between the array substrate 10 and the opposed substrate 20 so that the distance between the array substrate 10 and the opposed substrate 20 may be kept a prescribed spacing more accurately.

A driving circuit is connected to the substrates like them, and when a voltage is applied between the picture element electrode 105a and the opposed electrode 105b, the liquid crystal layer is driven. If the distance between the array substrate 10 and the opposed substrate 20 is made as close as possible within a range not making the reflectance excessively low, the driving voltage can be made small to speed up the response of the liquid crystal layer.

The picture element electrode 105a is one having transparency, and a thin film of ITO (indium, tin, oxide), for example, is used. The opposed electrode 105b does not require transparency, and various electrode materials such as aluminum, nickel, copper, silver, gold, and platinum, for example, are used. The formation of the picture element electrode 105a on the array substrate 10 is performed by a method such as deposition, sputtering, or photolithography.

The material of the insulative thin film formed on the surface of the picture element electrode 105a is not specifically limited to the extent that it has neither reactivity nor solubility to the liquid crystal material and is electrically insulative, and an organic substance such as polyimide and an inorganic substance such as silicon oxide can be given. Methods for forming the insulative thin film include known methods such as application by spin coating, and a method suitable for the material may be selected.

The thickness of the thin film is not specifically limited to the extent that it enables sufficient voltage application to the liquid crystal layer 30, but is preferably thin within a range not impairing the insulating properties from the viewpoint of low voltage driving. Alignment processing on the insulative thin film may be performed by rubbing processing or the like as appropriate. Although the insulative thin film is provided in this embodiment, a configuration not including the insulative thin film is possible.

Since the liquid crystal panel in which the liquid crystal composition of the first embodiment is used as the liquid crystal layer can lower the dielectric constant, the charge amount in rewriting can be reduced to reduce power consumption.

Figure 11:
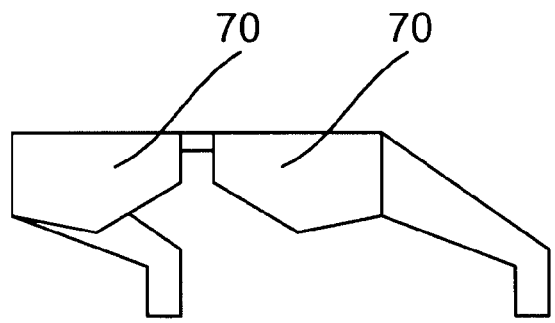
FIG. 11 is a perspective view showing liquid crystal shutter glasses according to the second embodiment.

Liquid crystal shutter glasses like those shown in FIG. 11 can be obtained by preparing two liquid crystal panels with a size of about three inches. More specifically, the liquid crystal shutter glasses include a first substrate, a second substrate opposed to the first substrate, and a liquid crystal layer held between the first substrate and the second substrate. The liquid crystal layer contains a liquid crystal material exhibiting the blue phase and a polymer having a first repeating unit containing a fluorine atom and an acrylic group. The liquid crystal shutter glasses may further include a voltage application unit (e.g. a driving circuit) that applies a voltage to the liquid crystal layer.

In FIG. 11, the liquid crystal panel is used for a shutter portion 70. Among 3D picture displays, there is a type in which an image shown to the right eye of a viewer and an image shown to the left eye are alternately displayed. Such a display is used together with shutter glasses that block the visual field of the left eye of the viewer when an image shown to the right eye is displayed and block the visual field of the right eye of the viewer when an image shown to the left eye is displayed.

Since the shutter glasses using the liquid crystal material of the blue phase achieve a high-speed response, the shutter can be switched in accordance with the display on the 3D picture display even when the image of the display is quickly switched.

The embodiment is only an example and the scope of the invention is not limited thereto.

First Example

An example of the liquid crystal panel will now be described.

First, a MoW (molybdenum, tungsten) comb-like electrode with a width of 10 μm and an interval of 10 μm was formed on the surface of a glass substrate (thickness: 0.7 mm). Next, polyimide (AL-1051; Japan Synthetic Rubber Co., Ltd.) was cast with a thickness of 70 nm as an insulating film on the electrode with a spinner to obtain the array substrate. Similarly, the opposed electrode was provided on another glass substrate (thickness: 0.7 mm), and an insulating film was formed thereon to obtain the opposed substrate. An adhesive was applied in a frame configuration to a surface of the opposed substrate on which the insulating film had been provided. Spacers with a diameter of 10 μm were scattered on the insulating film of the array substrate. After that, the array substrate and the opposed substrate were stuck together so that the insulating films of them may be opposed to each other, and were sealed while leaving an opening for injecting the liquid crystal layer.

Figure 12A:
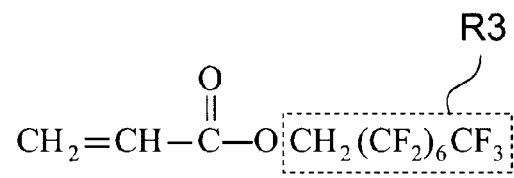
FIGS. 12A and 12B show monomers used for polymers according to a first example and a first comparative example.

The material of the liquid crystal layer was prepared as below. 79.5 wt % BL035 (manufactured by Merck & Co., Inc.) as a liquid crystal of a nematic phase, 10 wt % ZLI-4572 (manufactured by Merck & Co., Inc.) as a chiral agent, 5 wt % 1H,1H-pentadecafluoro-n-octyl acrylate (manufactured by Tokyo Chemical Industry Co., Ltd.) as the first acrylic monomer, and 5 wt % liquid crystalline monomer 1,4-di(4-(6-(acryloyloxy)hexyloxy)benzoyloxy)-2-methylbenzene (trade name: RM257, manufactured by Merck & Co., Inc.) as the second acrylic monomer were mixed together, then Irgacure™ 651 (manufactured by Ciba-Geigy Ltd.) was added as a polymerization initiator at 0.5 wt % for each type of monomer, and the materials were mixed together. FIG. 12A shows the structure of 1H,1H-pentadecafluoro-n-octyl acrylate (molecular formula: $C_{11}H_5F_{15}O_2$; a fluorine-substituted monomer). 1,4-di(4-(6-(acryloyloxy)hexyloxy)benzoyloxy)-2-methylbenzene is a compound in which the mesogenic group of FIG. 6 is used as R2 in the structure of FIG. 5B. 1H,1H-pentadecafluoro-n-octyl acrylate used as the first acrylic monomer has an acrylate structure, but only the end is substituted with fluorine. This is less expensive than one in which all the hydrogen atoms are substituted with fluorine.

The liquid crystal mixture thus obtained was injected between the substrates to form the liquid crystal panel. The panel was placed on a hot plate and the temperature was controlled to exhibit the blue phase.

Figure 12B:
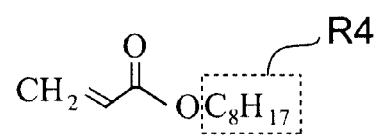

Also a liquid panel using n-octyl acrylate (molecular formula: $C_{11}H_{20}O_2$; a not-fluorine-substituted monomer) in place of 1H,1H-pentadecafluoro-n-octyl acrylate was fabricated for comparison. The composition other than n-octyl acrylate is as described above. FIG. 12B shows the structure of n-octyl acrylate (molecular formula: $C_{11}H_{20}O_2$).

1H,1H-pentadecafluoro-n-octyl acrylate is a compound in which 15 hydrogen atoms out of the 20 ones of n-octyl acrylate are substituted with fluorine atoms, and the substitutional rate is 75%.

Whereas the boiling point of the liquid crystal mixture using the fluorine-substituted monomer was 65 degrees, the boiling point of the liquid crystal mixture using the not-fluorine-substituted monomer of the comparative example was 57 degrees. By using the fluorine-substituted monomer, the boiling point of the liquid crystal mixture becomes high to suppress volatilization. Consequently, a composition deviation due to volatilization occurred less easily in the liquid crystal mixture using the fluorine-substituted monomer, when the mixture was injected between the substrates. Furthermore, this liquid crystal mixture had a low surface tension, and was therefore able to increase the injection speed.

A high pressure mercury lamp was used to irradiate the two liquid crystal panels with ultraviolet light to polymerize the monomers to form the liquid crystal layers. At this time, the intensity of the light irradiation was set to 100 mW/cm$^2$ (365 nm) and the irradiation time was set to one minute.

The polymer formed by using 1H,1H-pentadecafluoro-n-octyl acrylate is the polymer shown in FIG. 3 in which m of R1 is 1 and n is 6 (R3). On the other hand, the polymer formed by using n-octyl acrylate is a polymer in which R1 is replaced with $C_8H_{11}$ in the polymer shown in FIG. 3 (R4).

Next, for each of the two liquid crystal panels, a polarizing plate was stuck to the external surfaces of the array substrate and the opposed substrate so that the angle between the applied electric field direction and the transmission axis may be 45 degrees and the mutual transmission axes may be orthogonal, and the liquid crystal panels were thus completed.

The thickness of the liquid crystal layers of the liquid crystal panels was 5 μm. The liquid crystal panels thus fabricated are normally black. The liquid crystal panel fabricated by using the fluorine-substituted monomer is taken as a panel of a first example, and the liquid crystal panel fabricated by using the not-fluorine-substituted monomer is taken as a panel of a first comparative example.

It was found out that the liquid crystal layer of the panel of the first example was stabilized as the blue phase in a temperature range of −30° C. to 60° C. It was found out that the liquid crystal material of the panel of the first comparative example was stabilized as the blue phase in a temperature range of −30° C. to 52° C.

Figure 13:
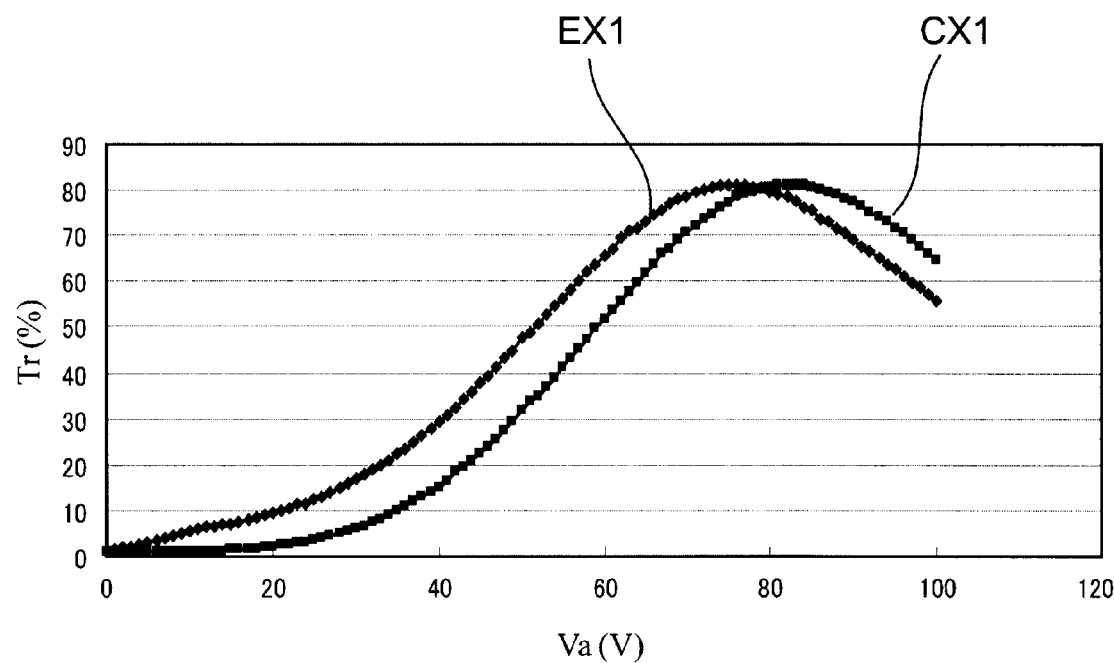
FIG. 13 shows relationships between the voltage and the transmittance of liquid crystal panels according to the first example and the first comparative example.

The voltage-transmitted light characteristics of the two panels were evaluated using 550 nm light at room temperature 25° C. FIG. 13 shows relationships between the voltage Va (horizontal axis) and the transmittance Tr (vertical axis). The voltage applied was a rectangular wave of 60 Hz. The transmittance represents the amount of light transmitted through the panel to the amount of light applied to the panel. In the panel of the first example, the transmittance was 0.5% when no voltage was applied. The transmittance was 81% when a voltage of 76 V was applied, and the transmittance was at a maximum when the voltage of this value was applied. The transmittance of a panel CX1 of the first comparative example was 0.5% when no voltage was applied. The transmittance was 81% when a voltage of 82 V was applied, and the transmittance was at a maximum when the voltage of this value was applied. As shown in FIG. 13, in a panel EX1 of the first example, the curve expressing the voltage dependence of the transmittance shifted to the low voltage side more than that of the panel of the first comparative example. That is, the voltage necessary for obtaining the same transmittance was smaller in the panel of the first example than in the panel of the first comparative example.

Figure 14A:
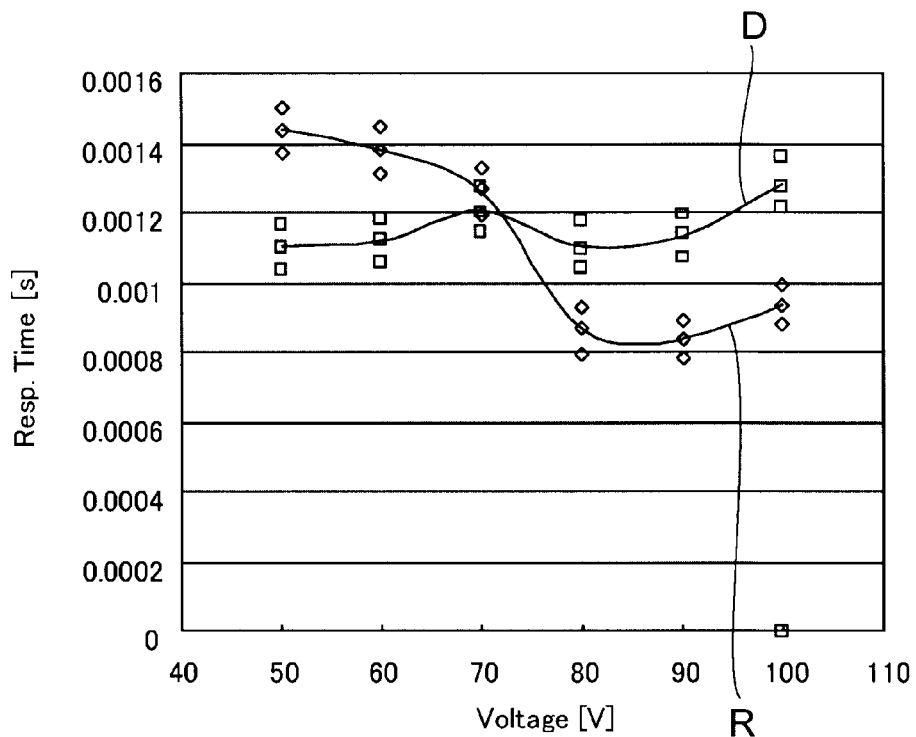
FIGS. 14A and 14B show relationships between the voltage and the response time of the liquid crystal panels according to the first example and the first comparative example.
Figure 14B:
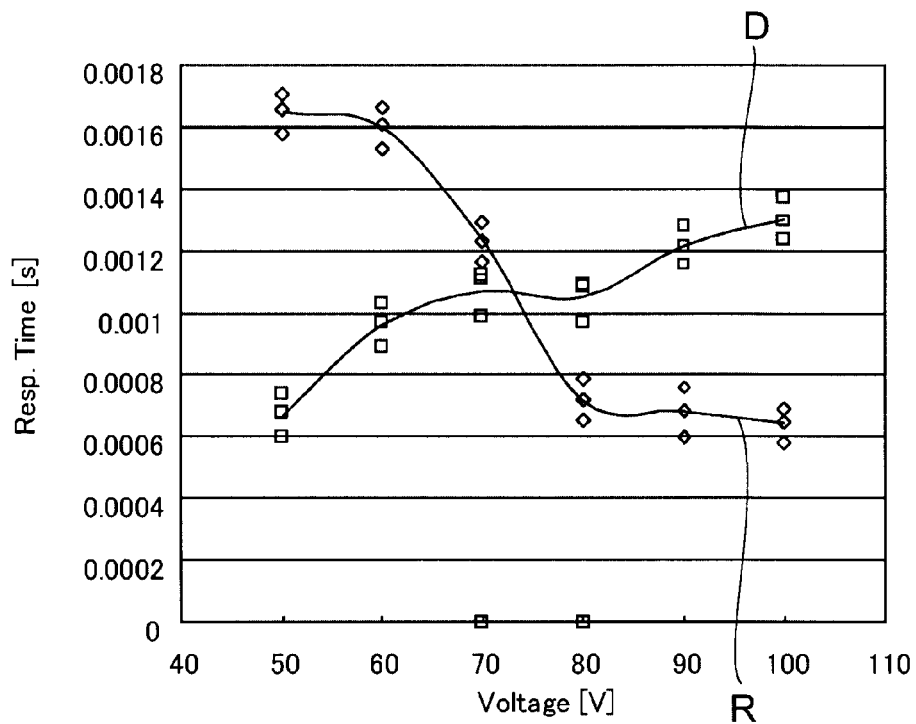

FIG. 14A and FIG. 14B show relationships between the voltage (horizontal axis) and the response time of the liquid crystal layer (vertical axis) in regard to the panel of the first example and the panel of the first comparative example. FIG. 14A shows the following in the panel of the first example: the response time (rise time R) from when a voltage is applied till when the liquid crystal layer acquires a transmittance corresponding to the voltage; and the time (decay time D) from when the voltage is changed from the state of being applied to zero till when the transmittance of light of the liquid crystal layer becomes zero. FIG. 14B is the measurement results for the panel of the first comparative example.

Both the rise time and the decay time were less than 1.5 ms in both panels. If the response time is approximately less than 1.5 ms, the liquid crystal material can be considered to exhibit the blue phase. Therefore, it has been confirmed that the liquid crystal material exhibits the blue phase and performs a high-speed response also in the case where fluorine is introduced into the polymer.

Figure 15A:
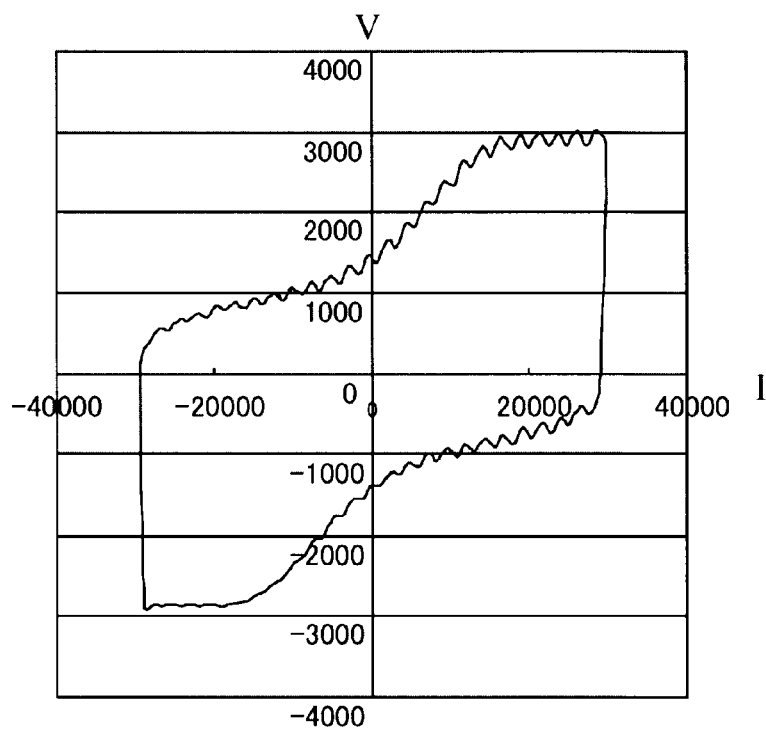
FIGS. 15A and 15B show the voltage-current characteristics of the liquid crystal panels according to the first example and the first comparative example.
Figure 15B:
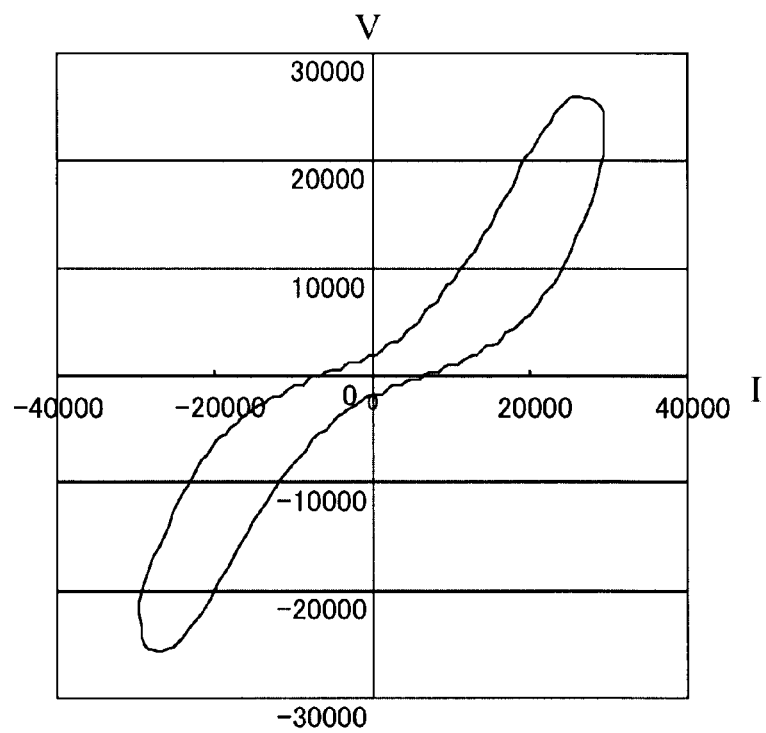

Next, FIG. 15A shows the I-V characteristics of the panel of the first example, and FIG. 15B shows the I-V characteristics of the panel of the first comparative example. In both drawings, the voltage is expressed by the horizontal axis and the current is expressed by the vertical axis.

The dielectric constant anisotropy was found based on Mathematical Formula 1 from FIG. 15A and FIG. 15B.

$$V(t)=d(\Delta\in s)^{-1}\int i(t)dt \qquad \text{Mathematical Formula 1}$$

(V(t): voltage, d: spacing between electrodes, $\Delta\in$: dielectric constant anisotropy, s: electrode cross-sectional area, i(t): current)

The dielectric constant anisotropy of the panel of the first example was found as $\Delta\in=33$ to 50. On the other hand, the dielectric constant anisotropy of the panel of the first comparative example was found as $\Delta\in=43$ to 90. It has been found out that the write charge amount of the entire cells decreases by using the polymer substituted with fluorine. This is considered to be due to the following reasons.

In polyethylene, which is a common polymer, the carbon chain is in a zigzag structure. On the other hand, Teflon (registered trademark), which is a polymer in which the hydrogen of polyethylene is substituted with fluorine, cannot have a zigzag structure like polyethylene but has a helical coil structure, because the van der Waals radius of a fluorine atom is slightly larger than that of a hydrogen atom. That is, Teflon™ has a rod-like molecular structure in which the surface of the carbon chain is closely covered with fluorine atoms. It is considered that there is such a stereostructural difference also between the polymer contained in the panel of the first example and the polymer contained in the panel of the first comparative example, and this difference is considered to reduce the dielectric constant.

The low dielectric constant can make the rewrite voltage, which is a voltage in rewriting the image, small and can provide a liquid crystal composition, a liquid crystal panel, and liquid crystal shutter glasses of low power consumption.

Second Example

An example of the invention will now be described.

A liquid crystal panel of a second example has the same structure as the first example except for the material of the liquid crystal layer 30. Identical portions to the first example are marked with the same reference numerals and a detailed description thereof is omitted.

The material of the liquid crystal layer 30 was prepared as below. Liquid crystals of a nematic phase, 40 wt % JC1041XX (manufactured by Chisso Corporation) and 40 wt % 5CB liquid crystal (manufactured by Aldrich Co.), 10 wt % ZLI-4572 (manufactured by Merck & Co., Inc.) as a chiral agent, 4.5 wt % 1H,1H,2H,2H-heptadecafluorodecyl acrylate (manufactured by Tokyo Chemical Industry Co., Ltd.) as a first monomer 40c, and 5 wt % RM-257 (manufactured by Merck & Co., Inc.) as a second liquid crystalline monomer 40d were mixed together, then Irgacure™ 651 (manufactured by Ciba-Geigy Ltd.) was added as a polymerization initiator 40e at 0.5 wt % for each type of monomer to prepare a mixture.

Figure 16A:
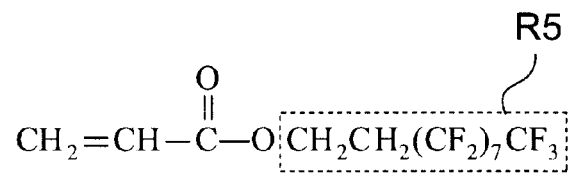
FIGS. 16A and 16B show monomers used for polymers according to a second example and a second comparative example.

FIG. 16A shows the structure of 1H,1H,2H,2H-heptadecafluorodecyl acrylate used as the first acrylic monomer. This first acrylic monomer has the structure of R1 of FIG. 5A in which m is 2 and n is 7 (R5).

Figure 16B:
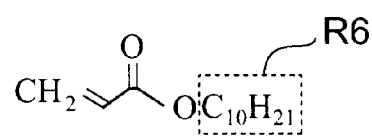

A liquid crystal layer was fabricated for comparison by using n-decyl acrylate as the first monomer. FIG. 16B shows the structure of n-decyl acrylate. n-Decyl acrylate has a structure in which R1 of FIG. 5A is replaced with $C_{10}H_{21}$ (R6).

1H,1H,2H,2H-heptadecafluorodecyl acrylate is a compound in which 17 hydrogen atoms out of the 24 ones of n-decyl acrylate are substituted with fluorine atoms, and the substitutional rate is 71%.

The material of the liquid crystal layer 30 thus obtained was injected into the liquid crystal panel 1 described above, then the liquid crystal panel 1 was placed on a hot plate, and the temperature was controlled to exhibit the blue phase. The boiling point of the liquid crystal layer using 1H,1H,2H,2H-heptadecafluorodecyl acrylate was 65° C., which was higher than the boiling point of the liquid crystal layer using n-decyl acrylate by eight degrees.

A high pressure mercury lamp was used to irradiate the liquid crystal layers with ultraviolet light to polymerize the precursor 40d. At this time, the intensity of the light irradiation was set to 100 mW/cm² (365 nm) and the irradiation time was set to one minute.

Next, a polarizing plate was stuck to the external surfaces of the array substrate 10 and the opposed substrate 20 so that the angle between the applied electric field direction and the transmission axis may be 45 degrees and the mutual transmission axes may be orthogonal, and a driver for driving (not shown) was connected to complete liquid crystal direct vision panels.

The liquid crystal panel fabricated by using 1H,1H,2H,2H-heptadecafluorodecyl acrylate is taken as a panel of the second example, and the liquid crystal panel fabricated by using n-decyl acrylate is taken as a panel of a second comparative example.

The polymer contained in the panel of the second example is the structure of FIG. 3 in which m is 2 and n is 7. The polymer contained in the panel of the second comparative example is a structure in which R1 of FIG. 3 is replaced with $C_{10}H_{21}$.

It was found out that, in the panel of the second example, the liquid crystal material was stabilized as the blue phase in a temperature range of −30° C. to 70° C.

The voltage-transmitted light characteristics of the panel of the second example were evaluated using 550 nm light at room temperature 25° C. In the panel of the second example, the transmittance was 0.5% when no voltage was applied, and was at a maximum when a rectangular wave of 100 V and 60 Hz was applied, the maximum transmittance being 81%. In regard to the response time, both the rise time and the decay time were less than 1.5 ms. Further, ∈=33 to 50 was found from the results of the I-V characteristics.

In regard to the panel of the second comparative example, it was found out that the liquid crystal material was stabilized as the blue phase in a temperature range of −30° C. to 60° C.

The voltage-transmitted light characteristics of the panel of the second comparative example were evaluated using 550 nm light at room temperature 25° C. The transmittance was 0.5% when no voltage was applied, and was at a maximum when a voltage of a rectangular wave of 100 V and 60 Hz was applied, the maximum transmittance being 81%. In regard to the response time, both the rise time and the decay time were less than 1.5 ms. Further, ∈=45 to 90 was found from the results of the I-V characteristics.

Thus, the second example can provide a liquid crystal composition, a liquid crystal panel, and liquid crystal shutter glasses in which the liquid crystal material exists stably as the blue phase, the dielectric constant is low, and the rewrite voltage is small.

Third Embodiment

Figure 17:
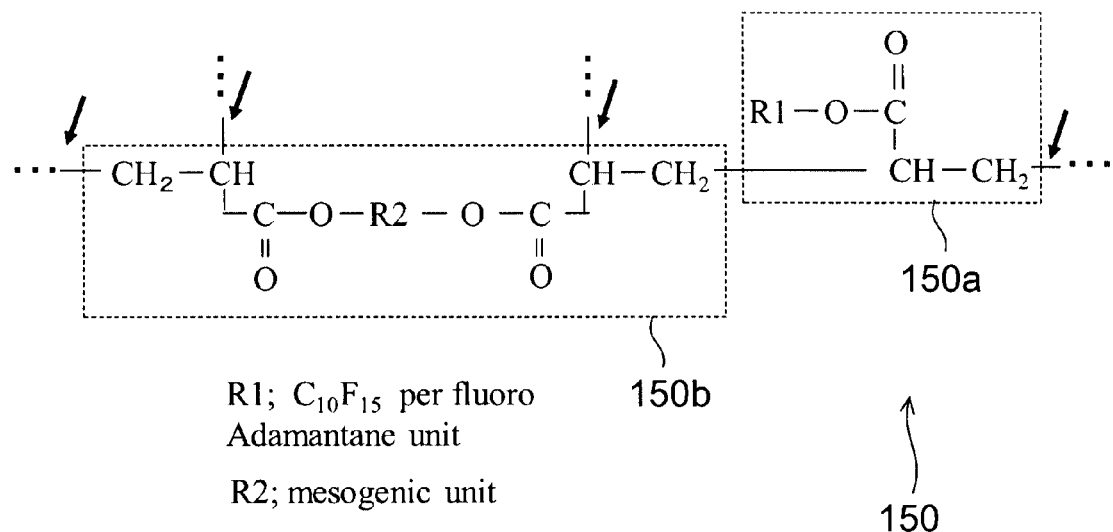
FIG. 17 shows a part of a polymer according to a third embodiment.
Figure 18:
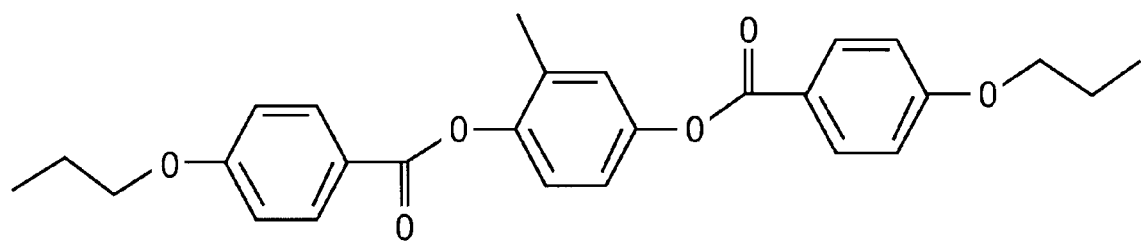
FIG. 18 shows a R2 part of the polymer according to the third embodiment.

FIG. 17 shows, as the polymer 50, the structure of a part of the polymer 150 in which two kinds of monomer having an acrylate unit (—CH$_2$—CH—C=O—O—) are polymerized. The polymer 150 has the first unit 150a and the second unit 150b as repeating units. One polymerization place of the first unit 150a is polymerized with one polymerization place of the second unit 150b. The first unit 150a has an adamantane group substituted with fluorine. R2 of the second unit 150b represents a mesogenic group. For example, a phenyl group, biphenyl group, terphenyl group, phenylcyclohexyl group, biphenylcyclohexyl group, azobenzene group, azoxybenzene group, benzylideneaniline group, stilbene group, and tolan group are given as the mesogenic group. Specifically, the structure of FIG. 18 can be given as R2.

Figure 19A:
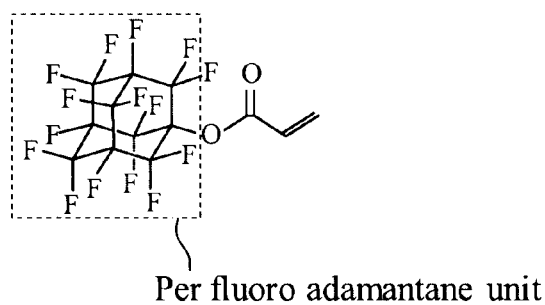
FIGS. 19A and 19B show monomers forming the polymer according to the third embodiment.
Figure 19B:
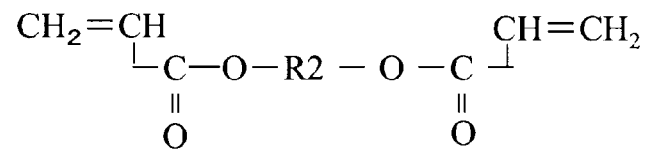

FIG. 19A and FIG. 19B show two kinds of monomer (the first acrylic monomer 151a and the second acrylic monomer 151b) used for forming the polymer 150. The first unit 150a derives from the first acrylic monomer 151a shown in FIG. 19A. The second unit 150b derives from the second acrylic monomer 151b shown in FIG. 19B.

The first unit 150a has two polymerization places (in FIG. 17, the place bonded to the second unit 150b and one place indicated by an arrow), and each polymerization place can thus be polymerized with another first unit 150a or the second unit 150b. The second unit 150b has four polymerization places (in FIG. 17, the place bonded to the first unit 150a and three places indicated by arrows), and each place can thus be polymerized with another first unit 150a or another second unit 150b.

About 2 to 20 first units 150a and about 2 to 20 second units 150b are contained in one polymer. The ratios of the first unit 150a and the second unit 150b are determined by the ratios of the first acrylic monomer 151a and the second acrylic monomer 151b used. For example, the ratio of the first acrylic monomer 151a to the second acrylic monomer 151b is set to one to one.

Figure 20:
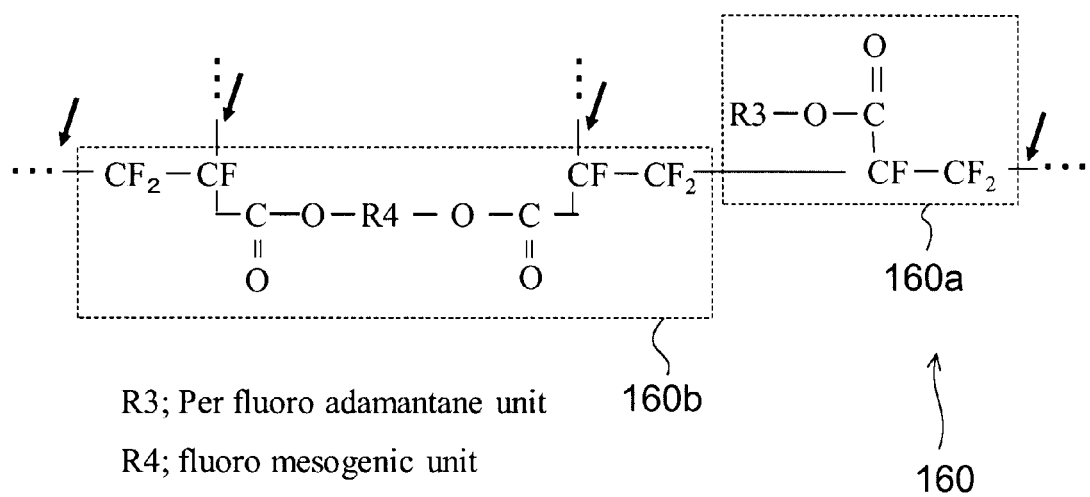
FIG. 20 shows a part of another polymer according to the third embodiment.

FIG. 20 shows the polymer 160 as another example of the polymer. The polymer 160 has the first unit 160a and the second unit 160b. The first unit 160a derives from the first acrylic monomer 161a of FIG. 22A. The second unit 160b derives from the second acrylic monomer 161b of FIG. 22B.

Figure 21:
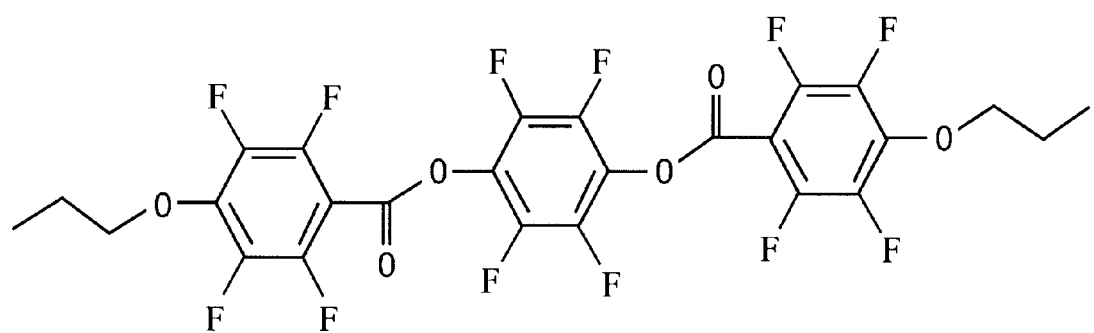
FIG. 21 shows a R4 part of the another polymer according to the third embodiment.

The first unit 160a of the polymer 160 is a structure in which all the hydrogen atoms bonded to carbon atoms are substituted with fluorine atoms in the first unit 150a of the polymer 150 shown in FIG. 17. In other words, an adamantane group R3 contained in the first unit 160a is fluorinated. The second unit 160b of the polymer 160 is a structure in which the hydrogen atoms of R2 are substituted with fluorine atoms in the second unit of the polymer 150 shown in FIG. 17. In other words, the mesogenic group contained in the second unit 160b of the polymer 160 is R4, a fluoromesogenic group. A structure in which the mesogenic group described above is fluorinated is given as the fluoromesogenic group. Specifically, the structure shown in FIG. 21 is given.

Figure 22A:
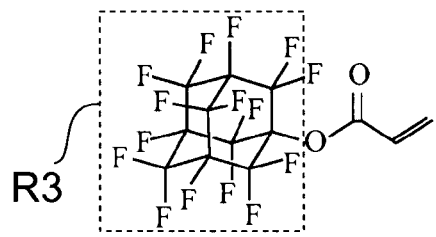
FIGS. 22A and 22B show monomers forming the another polymer according to the third embodiment.
Figure 22B:
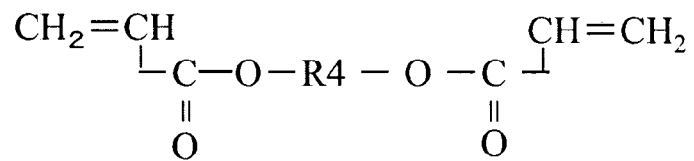

FIG. 22A and FIG. 22B show two kinds of monomer (the first acrylic monomer 161a and the second acrylic monomer 161b) used for forming the polymer 160. The first unit 160a derives from the first acrylic monomer 161a shown in FIG. 22A. The second unit 160b derives from the second acrylic monomer 161b shown in FIG. 22B.

The polymers 150 and 160 described above are only examples, and the embodiment can be carried out by using polymers having other structures.

Third Example

An example of the liquid crystal panel will now be described.

First, a MoW (molybdenum, tungsten) comb-like electrode with a width of 10 μm and an interval of 10 μm was formed on the surface of a glass substrate (thickness: 0.7 mm). Next, polyimide (AL-1051; Japan Synthetic Rubber Co., Ltd.) was cast with a thickness of 70 nm as an insulating film on the electrode with a spinner to obtain the array substrate. Similarly, the opposed electrode was provided on another glass substrate (thickness: 0.7 mm), and an insulating film was formed thereon to obtain the opposed substrate. An adhesive was applied in a frame configuration to a surface of the opposed substrate on which the insulating film had been provided. Spacers with a diameter of 10 μm were scattered on the insulating film of the array substrate. After that, the array substrate and the opposed substrate were stuck together so that the insulating films of them may be opposed to each other, and were sealed while leaving an opening for injecting the liquid crystal layer.

Figure 23A:
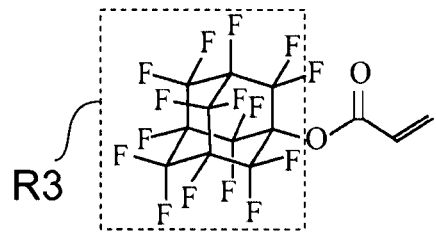
FIGS. 23A and 23B show monomers used for polymers according to a third example and a third comparative example.

The material of the liquid crystal layer was prepared as below. 79.5 wt % BL035 (manufactured by Merck & Co., Inc.) as a liquid crystal of a nematic phase, 10 wt % ZLI-4572 (manufactured by Merck & Co., Inc.) as a chiral agent, 5 wt % perfluoro-1-adamantyl acrylate as the first acrylic monomer, and 5 wt % liquid crystalline monomer 1,4-di(4-(6-(acryloyloxy)hexyloxy)benzoyloxy)-2-methylbenzene (trade name: RM257, manufactured by Merck & Co., Inc.) as the second acrylic monomer were mixed together, then Irgacure™ 651 (manufactured by Ciba-Geigy Ltd.) was added as a polymerization initiator at 0.5 wt % for each type of monomer, and the materials were mixed together. FIG. 23A shows the structure of perfluoro-1-adamantyl acrylate (molecular formula: $C_{13}H_3F_{15}O_2$; a fluorine-substituted monomer). 1,4-di(4-(6-(acryloyloxy)hexyloxy)benzoyloxy)-2-methylbenzene is a compound in which the mesogenic group of FIG. 20 is used as R2 in the structure of FIG. 19B. Perfluoro-1-adamantyl acrylate used as the first acrylic monomer has an acrylate structure, but only the adamantane skeleton is substituted with fluorine.

The liquid crystal mixture thus obtained was injected between the substrates to form the liquid crystal panel. The panel was placed on a hot plate and the temperature was controlled to exhibit the blue phase.

Figure 23B:
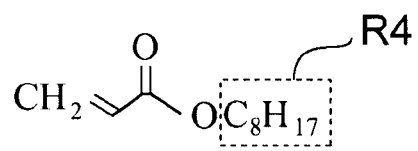

Also a liquid panel using n-octyl acrylate (molecular formula: $C_{11}H_{20}O_2$; a not-fluorine-substituted monomer) in place of perfluoro-1-adamantyl acrylate was fabricated for comparison. The composition other than n-octyl acrylate is as described above. FIG. 23B shows the structure of n-octyl acrylate (molecular formula: $C_{11}H_{20}O_2$).

Whereas the boiling point of the liquid crystal mixture using the fluorine-substituted monomer was 65 degrees, the boiling point of the liquid crystal mixture using the not-fluorine-substituted monomer of the comparative example was 57 degrees. By using the fluorine-substituted monomer, the boiling point of the liquid crystal mixture becomes high to suppress volatilization. Consequently, a composition deviation due to volatilization occurred less easily in the liquid crystal mixture using the fluorine-substituted monomer, when the mixture was injected between the substrates. Furthermore, this liquid crystal mixture had a low surface tension, and was therefore able to increase the injection speed.

A high pressure mercury lamp was used to irradiate the two liquid crystal panels with ultraviolet light to polymerize the monomers to form the liquid crystal layers. At this time, the intensity of the light irradiation was set to 100 mW/cm² (365 nm) and the irradiation time was set to one minute.

Next, for each of the two liquid crystal panels, a polarizing plate was stuck to the external surfaces of the array substrate and the opposed substrate so that the angle between the applied electric field direction and the transmission axis may be 45 degrees and the mutual transmission axes may be orthogonal, and the liquid crystal panels were thus completed. The thickness of the liquid crystal layers of the liquid crystal panels was 5 μm. The liquid crystal panels thus fabricated are normally black. The liquid crystal panel fabricated by using the fluorine-substituted monomer is taken as a panel of a third example, and the liquid crystal panel fabricated by using the not-fluorine-substituted monomer is taken as a panel of a third comparative example.

It was found out that the liquid crystal layer of the panel of the third example was stabilized as the blue phase in a temperature range of −30° C. to 60° C. It was found out that the liquid crystal material of the panel of the third comparative example was stabilized as the blue phase in a temperature range of −30° C. to 52° C.

Figure 24A:
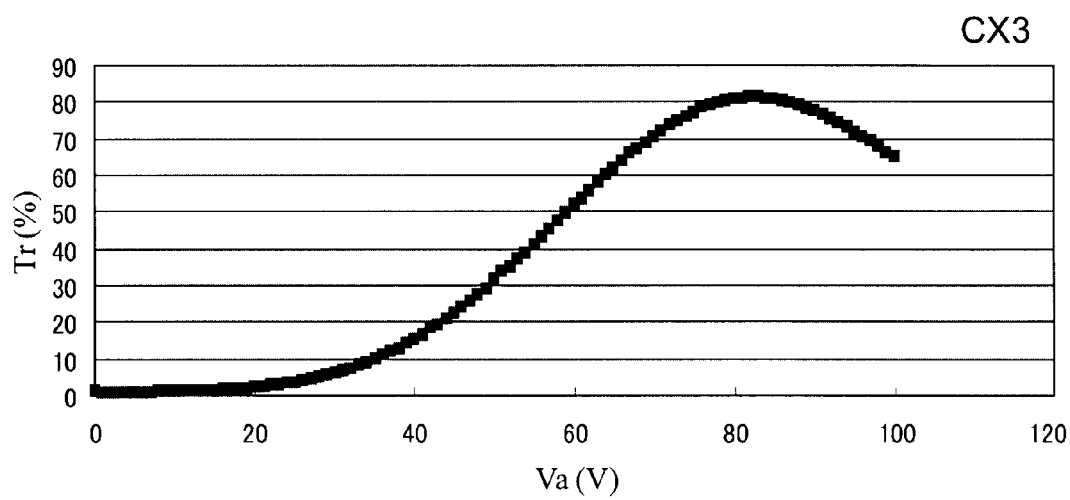
FIGS. 24A and 24B show relationships between the voltage and the transmittance of liquid crystal panels according to the third example and the third comparative example.
Figure 24B:
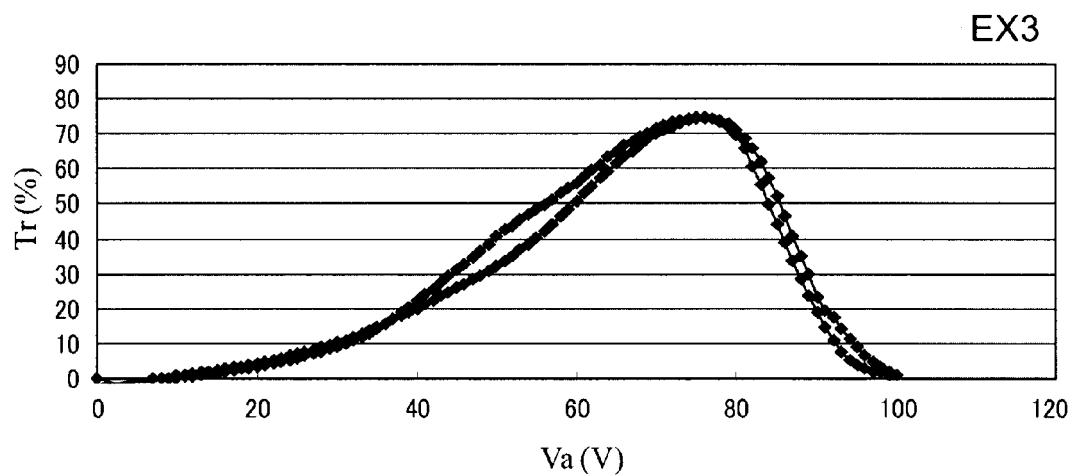

The voltage-transmitted light characteristics of the two panels were evaluated using 550 nm light at room temperature 25° C. FIG. 24A and FIG. 24B show relationships between the voltage Va (horizontal axis) and the transmittance Tr (vertical axis). The voltage applied was a rectangular wave of 60 Hz. The transmittance represents the amount of light transmitted through the panel to the amount of light applied to the panel. In a panel EX3 of the third example, the transmittance was 0.5% when no voltage was applied. The transmittance was 81% when a voltage of 76 V was applied, and the transmittance was at a maximum when the voltage of this value was applied. In a panel CX3 of the third comparative example, the transmittance was 0.5% when no voltage was applied. The transmittance was 81% when a voltage of 82 V was applied, and the transmittance was at a maximum when the voltage of this value was applied. As shown in FIG. 24A and FIG. 24B, in the panel EX3 of the third example, the curve expressing the voltage dependence of the transmittance shifted to the low voltage side more than that of the panel CX3 of the third comparative example. That is, the voltage necessary for obtaining the same transmittance was smaller in the panel of the third example than in the panel of the third comparative example.

Figure 25A:
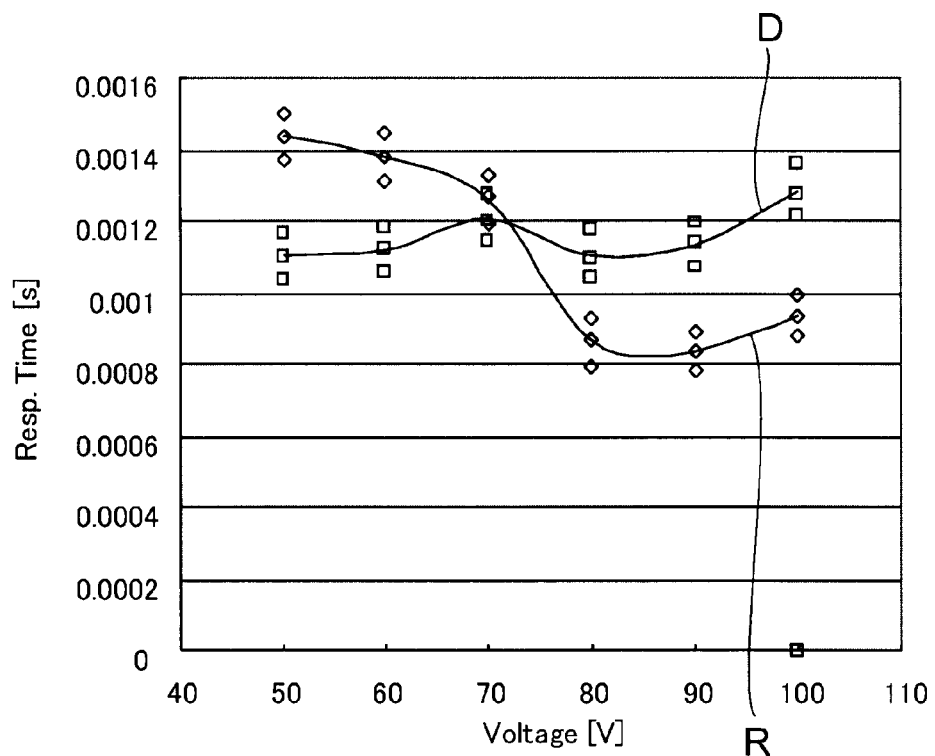
FIGS. 25A and 25B show relationships between the voltage and the response time of the liquid crystal panels according to the third example and the third comparative example.
Figure 25B:
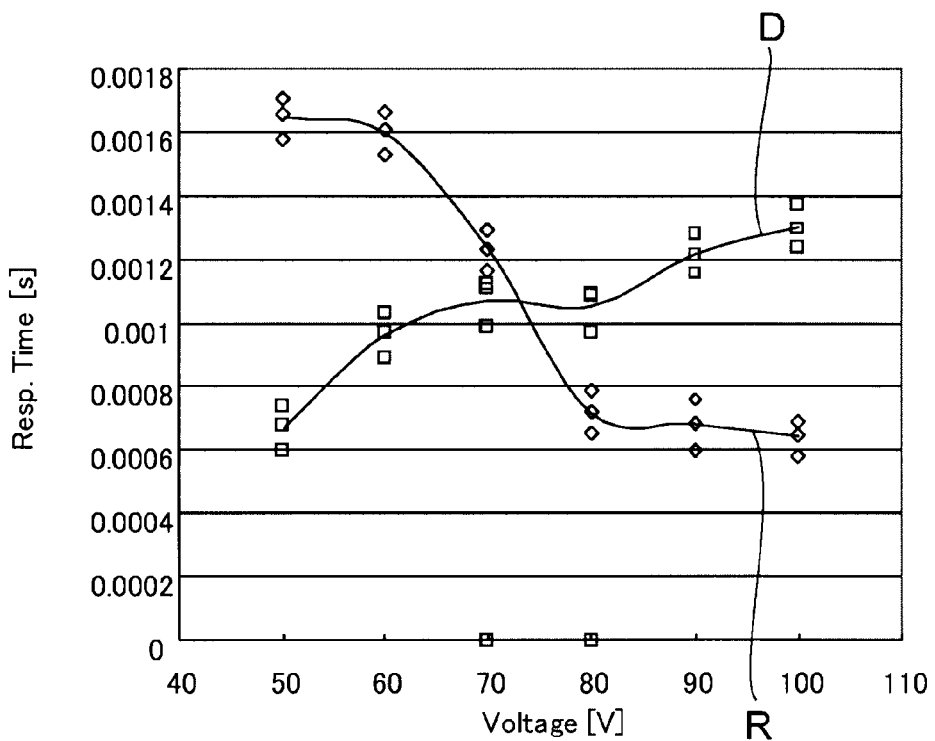

FIG. 25A and FIG. 25B show relationships between the voltage (horizontal axis) and the response time of the liquid crystal layer (vertical axis) in regard to the panel of the third example and the panel of the third comparative example. FIG. 25A shows the following in the panel of the third example: the response time (rise time R) from when a voltage is applied till when the liquid crystal layer acquires a transmittance corresponding to the voltage; and the time (decay time D) from when the voltage is changed from the state of being applied to zero till when the transmittance of light of the liquid crystal layer becomes zero. FIG. 25B is the measurement results for the panel of the third comparative example.

Both the rise time and the decay time were less than 1.5 ms in both panels. If the response time is approximately less than 1.5 ms, the liquid crystal material can be considered to exhibit the blue phase. Therefore, it has been confirmed that the liquid crystal material exhibits the blue phase and performs a high-speed response also in the case where fluorine is introduced into the polymer.

Figure 26:
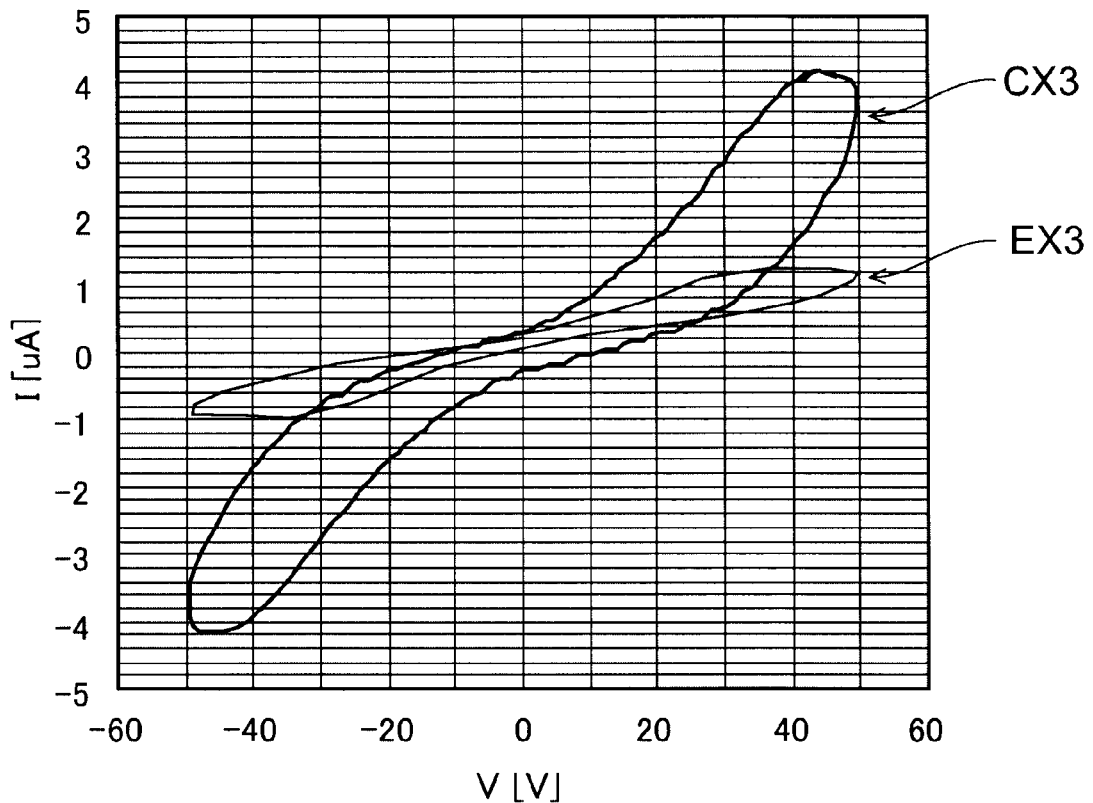
FIG. 26 shows the voltage-current characteristics of the liquid crystal panels according to the third example and the third comparative example.

Next, FIG. 26 shows the I-V characteristics of the panel EX3 of the third example and the I-V characteristics of the panel CX3 of the third comparative example. Regarding both curves, the voltage is expressed by the horizontal axis, and the current is expressed by the vertical axis.

The dielectric constant anisotropy was found based on Mathematical Formula 1 from FIG. 26.

$$V(t)=d(\Delta\in s)^{-1}\int i(t)dt \qquad \text{Mathematical Formula 1}$$

(V(t): voltage, d: spacing between electrodes, Δ∈: dielectric constant anisotropy, s: electrode cross-sectional area, i(t): current)

The dielectric constant anisotropy of the panel of the third example was found as Δ∈=33 to 50. On the other hand, the dielectric constant anisotropy of the panel of the third comparative example was found as Δ∈=43 to 90. It has been found out that the write charge amount of the entire cells decreases by using the polymer substituted with fluorine. This is considered to be due to the following reasons.

In polyethylene, which is a common polymer, the carbon chain is in a zigzag structure. On the other hand, Teflon (registered trademark), which is a polymer in which the hydrogen of polyethylene is substituted with fluorine, cannot have a zigzag structure like polyethylene but has a helical coil structure, because the van der Waals radius of a fluorine atom is slightly larger than that of a hydrogen atom. That is, Teflon™ has a rod-like molecular structure in which the surface of the carbon chain is closely covered with fluorine atoms. It is considered that there is such a stereostructural difference also between the polymer contained in the panel of the third example and the polymer contained in the panel of the third comparative example, and this difference is considered to reduce the dielectric constant.

The low dielectric constant can make the rewrite voltage, which is a voltage in rewriting the image, small and can provide a liquid crystal composition, a liquid crystal panel, and liquid crystal shutter glasses of low power consumption.

Fourth Example

An example of the invention will now be described.

A liquid crystal panel of a fourth example has the same structure as the third example except for the material of the liquid crystal layer 30. Identical portions to the third example are marked with the same reference numerals and a detailed description thereof is omitted.

The material of the liquid crystal layer 30 was prepared as below. Liquid crystals of a nematic phase, 40 wt % JC1041XX (manufactured by Chisso Corporation) and 40 wt % 5CB liquid crystal (manufactured by Aldrich Co.), 10 wt % ZLI-4572 (manufactured by Merck & Co., Inc.) as a chiral agent, 4.5 wt % perfluoro-1-adamantyl methacrylate as the first monomer 40c, and 5 wt % RM-257 (manufactured by Merck & Co., Inc.) as the second liquid crystalline monomer 40d were mixed together, then Irgacure™ 651 (manufactured by Ciba-Geigy Ltd.) was added as the polymerization initiator 40e at 0.5 wt % for each type of monomer to prepare a mixture.

Figure 27A:
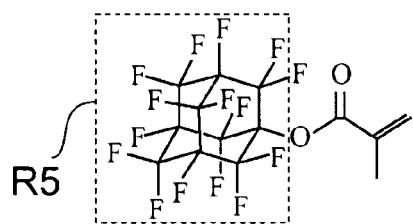
FIGS. 27A and 27B show monomers used for polymers according to a fourth example and a fourth comparative example.
Figure 27B:
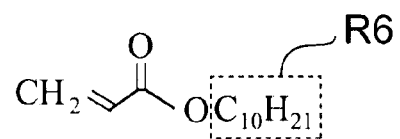

FIG. 27A shows the structure of perfluoro-1-adamantyl methacrylate used as the first acrylic monomer. A liquid crystal layer was fabricated for comparison by using n-decyl acrylate as the first monomer. FIG. 27B shows the structure of n-decyl acrylate. n-Decyl acrylate has a structure in which R1 of FIG. 5A is replaced with $C_{10}H_{21}$ (R6).

The material of the liquid crystal layer 30 thus obtained was injected into the liquid crystal panel 1 described above. Then, the liquid crystal panel 1 was placed on a hot plate and the temperature was controlled to exhibit the blue phase. The boiling point of the liquid crystal layer using perfluoro-1-adamantyl methacrylate was 65° C., which was higher than the boiling point of the liquid crystal layer using n-decyl acrylate by eight degrees.

A high pressure mercury lamp was used to irradiate the liquid crystal layers with ultraviolet light to polymerize the precursor 40d. At this time, the intensity of the light irradiation was set to 100 mW/cm² (365 nm) and the irradiation time was set to one minute.

Next, a polarizing plate was stuck to the external surfaces of the array substrate 10 and the opposed substrate 20 so that the angle between the applied electric field direction and the transmission axis may be 45 degrees and the mutual transmission axes may be orthogonal, and a driver for driving (not shown) was connected to complete liquid crystal direct vision panels.

The liquid crystal panel fabricated by using perfluoro-1-adamantyl methacrylate is taken as a panel of the fourth example, and the liquid crystal panel fabricated by using n-decyl acrylate is taken as a panel of a fourth comparative example.

It was found out that, in the panel of the fourth example, the liquid crystal material was stabilized as the blue phase in a temperature range of −30° C. to 70° C.

The voltage-transmitted light characteristics of the panel of the fourth example were evaluated using 550 nm light at room temperature 25° C. In the panel of the fourth example, the transmittance was 0.5% when no voltage was applied, and was at a maximum when a rectangular wave of 100 V and 60 Hz was applied, the maximum transmittance being 81%. In regard to the response time, both the rise time and the decay time were less than 1.5 ms. Further, $\in$=33 to 50 was found from the results of the I-V characteristics.

In regard to the panel of the fourth comparative example, it was found out that the liquid crystal material was stabilized as the blue phase in a temperature range of −30° C. to 60° C.

The voltage-transmitted light characteristics of the panel of the fourth comparative example were evaluated using 550 nm light at room temperature 25° C. The transmittance was 0.5% when no voltage was applied, and was at a maximum when a voltage of a rectangular wave of 100 V and 60 Hz was applied, the maximum transmittance being 81%. In regard to the response time, both the rise time and the decay time were less than 1.5 ms. Further, $\in$=45 to 90 was found from the results of the I-V characteristics.

Thus, the fourth example can provide a liquid crystal composition, a liquid crystal panel, and liquid crystal shutter glasses in which the liquid crystal material exists stably as the blue phase, the dielectric constant is low, and the rewrite voltage is small.

Figure 28A:
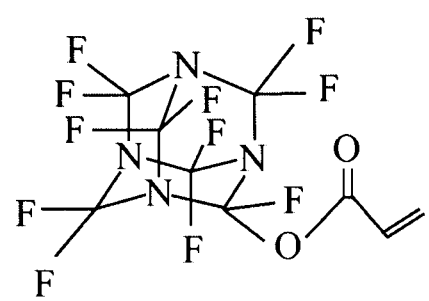
FIGS. 28A and 28B show monomers forming the another polymer according to the third embodiment.
Figure 28B:
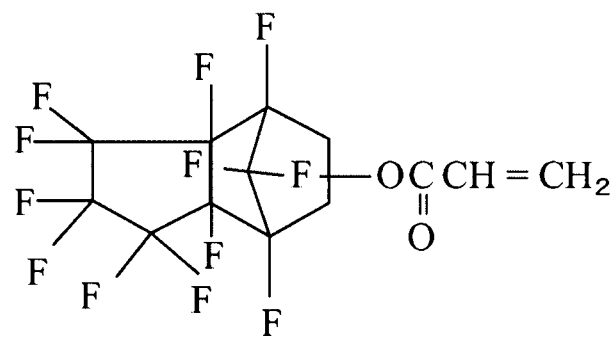

Other than perfluoro-1-adamantyl methacrylate used as the first acrylic monomer, the fluorine-substituted cyclic acrylic monomers of the structures shown in FIG. 28A and FIG. 28B may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal composition comprising:
a liquid crystal material exhibiting a blue phase; and
a polymer comprising a repeating unit of
Formula 1:

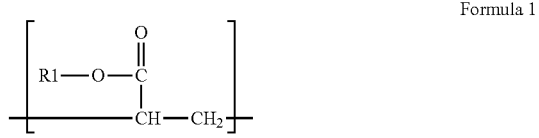

Formula 1 wherein
R1 is a fluoro substituted alkyl group, at least having a fluorine atom bonded to a carbon at an end of the alkyl carbon chain farthest from the ester oxygen.

2. The composition according to claim 1, wherein R1 is a linear fluoro substituted alkyl group at least having a fluorine atom bonded to a carbon at an end of the alkyl carbon chain farthest from the ester oxygen.

3. The composition according to claim 1, wherein the repeating unit of Formula 1 is a repeating unit of Formula 2:

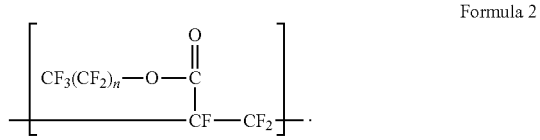

Formula 2 wherein n is a natural number.

4. The composition according to claim 1, wherein
the polymer further comprises a repeating unit obtained by polymerization of a compound of Formula 3:

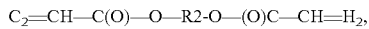

wherein R2 is a mesogenic group.

5. A liquid crystal panel comprising:
an array substrate including a plurality of picture element electrodes arranged in an array configuration;
an opposed substrate opposed to the array substrate; and
a liquid crystal layer between the array substrate and the opposed substrate; and
a voltage application unit configured to apply a voltage to the liquid crystal layer;
wherein the liquid crystal layer comprises:
a liquid crystal material exhibiting a blue phase; and
a polymer comprising a repeating unit of Formula 1

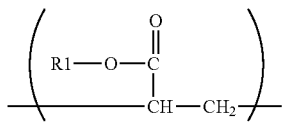

Formula 1 wherein
R1 is a fluoro substituted alkyl group, at least having a fluorine atom bonded to a carbon at an end of the alkyl carbon chain farthest from the ester oxygen.

6. A liquid crystal shutter glass comprising:
a first substrate;
a second substrate opposed to the first substrate;
a liquid crystal layer between the first substrate and the second substrate; and
a voltage application unit configured to apply a voltage to the liquid crystal layer; wherein the liquid crystal layer comprises:
a liquid crystal material exhibiting a blue phase; and
a polymer comprising a repeating unit of Formula 1

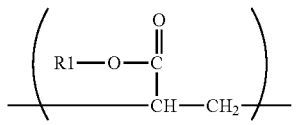

Formula 1 wherein
R1 is a fluoro substituted alkyl group, at least having a fluorine atom bonded to a carbon at an end of the alkyl carbon chain farthest from the ester oxygen.

7. The composition according to claim 4, wherein R2 is selected from the mesogenic groups consisting of phenyl, biphenyl, terphenyl, phenylcyclohexyl, biphenylcyclohexyl, azobenzene, azoxybenzene, benzylideneaniline, stilbene and tolan (diphenyl acetylene).

8. The composition according to claim 4, wherein the compound of Formula 3 is 1,4-di(4-(6-(acryloyloxy)hexyloxy)benzoyloxy)-2-methylbenzene.

9. The composition according to claim 4, wherein the polymer comprises:
from 2 to 20 repeating units of Formula 1; and
from 2 to 20 repeating units of Formula 3.

10. The composition according to claim 4, wherein a ratio of a number of repeating units of Formula 1 to a number of repeating units of Formula 3 is about 1 to 1.

11. The liquid crystal panel according to claim 5, wherein
the polymer further comprises a repeating unit obtained by polymerization of a compound of Formula 3:

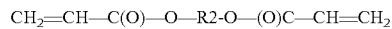

wherein R2 is a mesogenic group.

12. The liquid crystal panel according to claim 11, wherein R2 is selected from the mesogenic groups consisting of phenyl, biphenyl, terphenyl, phenylcyclohexyl, biphenylcyclohexyl, azobenzene, azoxybenzene, benzylideneaniline, stilbene and tolan (diphenylacetylene).

13. The liquid crystal panel according to claim 11, wherein the compound of Formula 3 is 1,4-di(4-(6-(acryloyloxy)hexyloxy)benzoyloxy)-2-methylbenzene.

14. The liquid crystal shutter glass according to claim 6, wherein
the polymer further comprises a repeating unit obtained by polymerization of a compound of Formula 3:

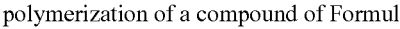

wherein R2 is a mesogenic group.

15. The liquid crystal shutter glass according to claim 14, wherein R2 is selected from the mesogenic groups consisting of phenyl, biphenyl, terphenyl, phenylcyclohexyl, biphenylcyclohexyl, azobenzene, azoxybenzene, benzylideneaniline, stilbene and tolan (diphenylacetylene).

16. The liquid crystal shutter glass according to claim 14, wherein the compound of Formula 3 is 1,4-di(4-(6-(acryloyloxy)hexyloxy)benzoyloxy)-2-methylbenzene.

* * * * *